United States Patent [19]

Schwarzer

[11] 4,265,707

[45] May 5, 1981

[54] METHOD AND APPARATUS FOR SEPARATING FISSION AND ACTIVATION PRODUCTS FROM GAS ATMOSPHERES

[75] Inventor: Klemens Schwarzer, Jülich, Fed. Rep. of Germany

[73] Assignee: Kernforschungsanlage Jülich Gesellschaft mit beschränkter Haftung, Jülich, Fed. Rep. of Germany

[21] Appl. No.: 965,910

[22] Filed: Dec. 4, 1978

[30] Foreign Application Priority Data

Dec. 15, 1977 [DE] Fed. Rep. of Germany ....... 2755881

[51] Int. Cl.[2] ......................... G21C 9/00; B01D 57/00

[52] U.S. Cl. ......................................... 176/37; 176/38; 55/1; 55/262; 55/385 A; 55/DIG. 9

[58] Field of Search ............. 55/1, 68, 69, 262, 385 R, 55/385 A, DIG. 9, DIG. 25; 176/37, 38, 58 R, 60; 252/301.1 W

[56] References Cited

U.S. PATENT DOCUMENTS

| | | | |
|---|---|---|---|
| 2,795,482 | 6/1957 | McNabney | 176/37 |
| 3,338,665 | 8/1967 | Silverman | 176/37 |
| 3,764,552 | 10/1973 | Godbee et al. | 252/301.1 W |
| 3,871,842 | 3/1975 | Queiser et al. | 176/37 |
| 4,067,771 | 1/1978 | Rubin | 176/38 |

FOREIGN PATENT DOCUMENTS

| | | | |
|---|---|---|---|
| 1433074 | 2/1966 | France | 176/37 |

*Primary Examiner*—David L. Lacey

*Attorney, Agent, or Firm*—Frishauf, Holtz, Goodman & Woodward

[57] ABSTRACT

As a safety measure to reduce the content of fission and activation products in the gas atmosphere contained within a nuclear reactor building after a so-called hypothetical malfunction, in a high-temperature gas-cooled reactor, the gas atmosphere within the reactor building is dusted with at least 0.5 kilogram, preferably more than 1 kg per 50 $m^3$ of gas atmosphere volume, with particles having an average effective particle diameter in the range between 0.3 to 5 $\mu m$, preferably of a material inert to oxygen, such as bentonite or clay, although graphite particles may be used if they are carried into the space with an inert gas carrier. The dusting is performed by a pneumatic system comprising a source of compressed gas, such as air or nitrogen, located outside the reactor building, and feed pipes feeding a pattern of dusting nozzles distributed over the ceiling of the interior space of the reactor building. The various feed pipes have dust hopper containers from the bottom of which the flow of gas draws off the dust to the dusting nozzles.

7 Claims, 3 Drawing Figures

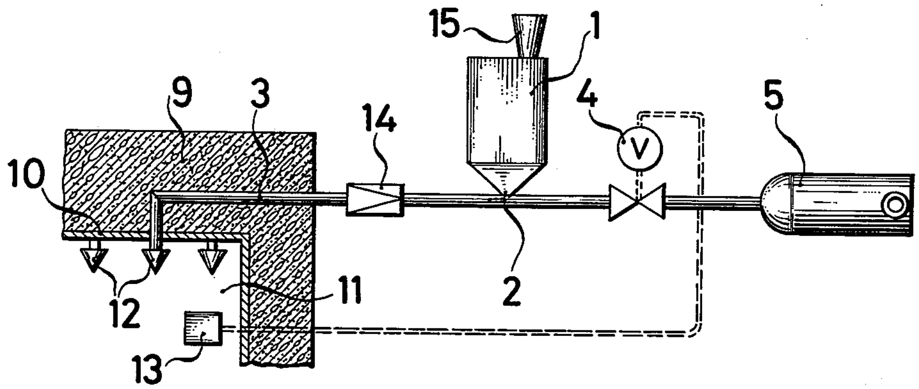
FIG.1
FIG.2
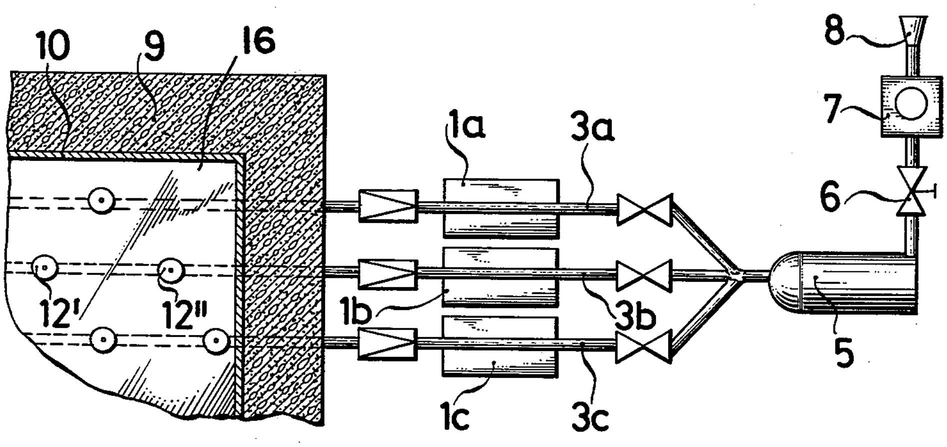

METHOD AND APPARATUS FOR SEPARATING FISSION AND ACTIVATION PRODUCTS FROM GAS ATMOSPHERES

This invention concerns a method for the separation of nuclear fission and activation products from a gas containing the same and apparatus for carrying out the method in and about a reactor building of a gas-cooled nuclear reactor. The process of this invention is particularly intended to make possible the separation of fission and activation products that occur within the containing walls of gas-cooled high temperature reactors in the case of serious so-called "hypothetical malfunctions," as malfunctions with small likelihood of occurrence are called.

Nuclear fission or activation products can be set free in the rooms of the reactor building, with a large part of the space in the reactor building becoming radioactively contaminated, as a consequence of a serious hypothetical malfunction in which, after failure of the emergency cooling system, gas conduit pipes, or other components of a gas-cooled high-temperature reactor, burst.

Nuclear fission and activation products contained in the gas atmosphere do lose their activity by physical and chemical degeneration processes, but the radionuclides remaining in the gas atmosphere, nevertheless, are a great danger to the enviroment. This is particularly the case if, as the result of leakages in the outer wall structure of the reactor building resulting from the malfunction, nuclear fission and activation products can escape into the outside environment.

The requirements for separation of the nuclear fission and activation products, in addition to physical and chemical boundary conditions for the degeneration processes, depend above all on the geometrical dimensions and shapes of available space enclosed by the reactor building, particularly the ratio of surface of the enclosed space to the volume of the building. The liberated fission and activation products are present in the form aerosols, partly even in elemental form, which is to say atomic or molecular, so that the settling velocity for the fission and activation products resulting from diffusion and sedimentation are greatly delayed compared to the desired settling rates.

In order to increase the settling rate, it is known from German published patent application No. OS 20 50 152 to innoculate the cooling stream with inactive isotopes of the fission and activation products that are produced in order to bind these fission and activation products, that might penetrate into the cooling medium circulation path of a nuclear reactor facility. This process, however, requires, independently from the occurrence of a malfunction, a continuous addition of dilute solutions containing the inactive isotopes, even during normal operation of the reactor.

In the case of water-cooled nuclear reactors, it is known, after the fracture of a part of an apparatus or a pipeline of the reactor, to condense the vapor coming out of the fracture quickly by squirting in condensation nuclei, such as carbon dioxide snow or silver iodide, and in this way to bind the escaping radioactive substances (see German published patent application OS No. 20 57 593). For gas-cooled high-temperature reactors, the addition of such water condensing nuclei is either useless or uneconomic, however, because the gases escaping from the cooling medium circulation path in most malfunctions are dry gases.

In the case of gas-cooled high-temperature reactors, filter systems are provided in the air circulation system of the reactor building, by which the fission and activation products are intended to be separated after occurrence of the malfunction by drawing off the atmosphere by suction from the radioactively contaminated chambers. There is the disadvantage, however, that such installations, as the result of their technically limited start-up and heat capacity filter out the liberated fission and activation products only relatively slowly and, on account of their dependence upon the supply of external energy—according to the gravity of the malfunction—are under certain conditions not at all capable of going into operation.

THE PRESENT INVENTION

It is an object of the invention to provide a process for separation of nuclear fission and activation products from a gas atmosphere by which high settling rates for the products contained in the gas atmosphere are obtainable, without the necessity of withdrawing the gas atmosphere out of the radioactively contaminated chambers or spaces.

Briefly, at least 0.5 kilogram, preferably more than one kilogram per 50 $m^3$ of atmosphere volume, of dust particles having a grain size distribution with an average particle size between 0.3 and 5 $\mu m$ is introduced in fine dispersion into the gas atmosphere. By "average particle size" is meant the particle size average value that is obtained as the characteristic size d' of the dust particle accumulation at the intersection point of the RRS straight line for a residue value $R=36.8\%$ in the grain size matrix according to Rosin-Rammler-Sperling.

See "Verfahrenstechnik" [process technology] by Kiesskalt, published by Carl Hanser Verlag, Munich, 1958, pp. 61ff.

By means of the dust particles (i.e., fine dry particles), the surface available for the settling of the fission and activation products in radioactively contaminated spaces is substantially magnified. At the same time, in the case of homogeneous particle distribution in the spaces in question, the critical free path length for the adsorption or settling of the fission and activation products is drastically reduced, and these fission and activation products are bound to the surface of the dust particles. This advantageously leads to a substantial increase of the settling or adsorption velocity which now is no longer dependent on the magnitude of the fission and activation product itself, but rather upon the size of the dust particles. The limits of the average particle diameter of the aggregate cloud of particles, therefore, are determined at the low extremity by the desired settling or adsorption velocity and at the upper extremity by the distribution of the particles and the aerosol formation in the gas atmosphere in the radioactively contaminated space. The binding of the fission and activation products to the dust particles diminishes at the same time the probability of escape of fission and activation products from leaks in the outer wall structure of the reactor building.

As a further development of the method of the invention, the dust particles that are introduced comprise ceramic materials that are inert with respect to oxygen. Suitable dust size particles of this type consist of bentonite or clay. Cement or silica gel powders are also useable. The so-called extinguisher powders are preferred, these being powders commonly used in fire fighting. Graphite dust, because of its adsorptive capability, is also useable for inert gas atmospheres in the reactor building. In this case it is necessary to blow the material into the gas atmosphere by means of an inert gas in order to prevent explosions of the graphite dust.

For carrying out the process according to the invention in a reactor building of a gas-cooled nuclear reactor having an outer pre-stressed concrete wall structure equipped with a liner, apparatus with the following features is provided according to the invention: The outlet of a dust hopper container feeds into a pneumatic feed line for drawing off dust particles stored in the container. The pneumatic feed line passes through the pre-stressed concrete wall structure and at its extremity outside of the wall structure is connectable to gas compression equipment that is situated in the neighborhood of the reactor building. The end portion of this pneumatic feed line that leads into the internal space of the reactor building has at least one dusting nozzle, and, preferably, several of them. The apparatus according to the invention, is advantageously capable of being put into operation within the reactor building independently of the apparatus destroyed as the result of the malfunction that has produced the radioactive contamination. To this extent, therefore, a passive safety system is provided. It is useful to locate the dust hopper also outside of the reactor building, so that the quantity of dust to be introduced into the reactor building can, from time to time, be increased beyond the amount contained in the hopper by way of supply.

As mentioned before, in order to prevent dust explosions in the use of graphite dust, inert gas should be introduced as the compressed gas for the pneumatic feed.

A homogeneous distribution of dusting material and aerosol formation in radioactively contaminated spaces is enhanced by providing a number of feed ducts or feed duct branches leading to dusting nozzles in the internal space and which are uniformly distributed over the ceiling surface of the reactor building.

The invention is further described by way of illustrative example of a particular apparatus and its operation, with references to the annexed drawings, in which:

FIG. 1 is a diagram, partly in section, of apparatus for blowing dust particles into the internal space of a reactor building;

FIG. 2 is a diagram illustrating the distribution of dusting nozzles over a ceiling surface, by a view, partly in section, at right angles to that shown in FIG. 1; and FIG. 3 is a graph showing the reduction of the content of fission and activation products after blowing in of various quantities of powder having an average particle diameter $d'=0.5$ μm in a space having a volume of $50 \cdot 10^3 m^3$, as a function of time.

DETAILED DESCRIPTION

Figure 3:
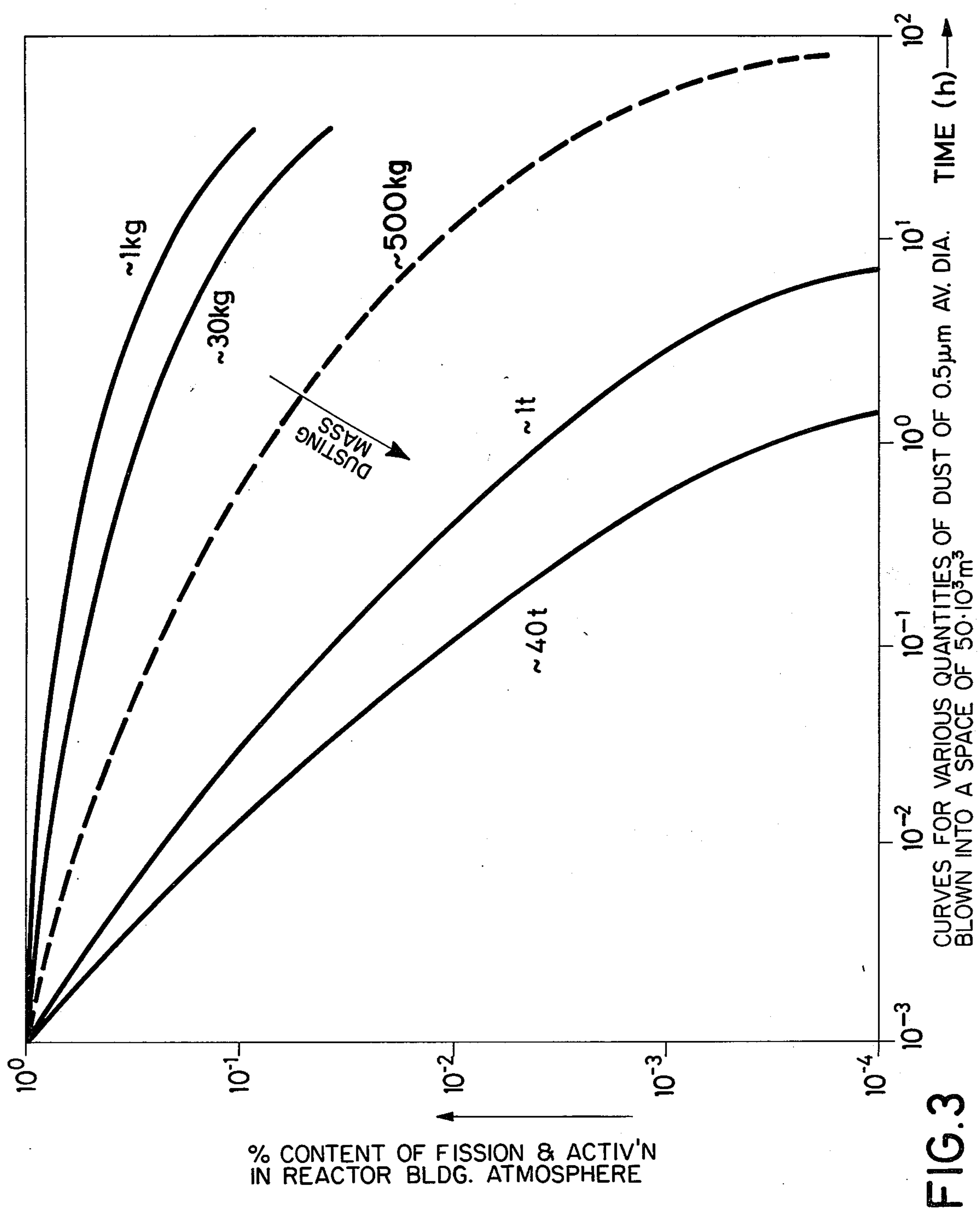

As shown in the drawings, the apparatus for carrying out the process of the invention comprises a dust container 1 of the hopper type, having its outlet 2 leading into a pneumatic feed line 3. One end of the feed line 3 is connected to equipment for supplying gas under pressure that includes a reducing valve 4 for setting the gas pressure in the feed line and, also, a compressed gas storage tank 5 which can be filled with compressed gas after opening of a gate cock 6 between the tank 5 and a compressor 7. In the illustrated example, air is used as the compressed gas. It is also possible, however, to connect gas storage tanks filled with inert gas, especially nitrogen tanks, to the suction pipe 8 of the compressor 7, for use in order to prevent dust explosions when combustible dusting powder is used. In the illustrated example, fire estinguishing powders are stored in the dust hopper 1, such materials having very little danger of explosion.

The equipment for supplying compressed gas is installed outside the reactor building. In FIGS. 1 and 2, the illustration of the reactor building itself is limited merely to a portion of the outer pre-stressed concrete wall structure 9 having a liner 10 provided on its internal side. Within the reactor building, there is located a gas-cooled high-temperature nuclear reactor that is not shown in the drawing. The pneumatic feed line 3 leads through the pre-stressed concrete wall structure 9 and ends in the internal space 11 of the reactor building. At this end of the feed line 3, a dust dispersion nozzle 12 is provided through which the dusting material, carried through the feed line 3 by compressed gas, issues in fine dispersion into the internal space. The gas pressure in the feed line 3 is set at a value that depends on the pressure in the internal space 11. For this purpose, the pressure reduction valve 4 is in operative connection with a pressure-sensing box or enclosure 13 located in the internal space 11.

In order to prevent or mitigate undersired effects of overpressure occurring in the internal space of the reactor building, particularly pressure shocks produced by the contingency in question, on the pneumatic feed line 3 and the dust hopper 1, a check valve 14 is inserted in the feed line downstream, in the direction of feed, of the outlet 2 of the dust hopper.

The orifice of the outlet 2 of the dust hopper 1 in the feed line 3 is conventiently constituted as a tube opening out in the feed direction, so that the dusting powder stored in the hopper 1 can be drawn out by the gas flowing in the feed line 3, completely and without disturbance. In order to make it possible to introduce additional quantities of dusting powder, beyond the amount left over from the last charge, at any particular time, and to furnish the same to the space within the reactor building, an input device 15 is provided at the top of the dusting powder hopper container 1. In the illustrated example, the dusting powder hopper 1 is conveniently located outside of the reactor building. The dusting powder hopper can, however, also be provided inside the reactor building.

FIG. 2, which is a bottom view of the equipment shown in FIG. 1, shows that the equipment 5,6,7,8 for supplying compressed gas feeds a number of feed pipes 3*a*, 3*b*, 3*c* connected in parallel. In the illustrated example, only three branches are shown but, of course, a branching manifold could be provided taking care of many more such parallel feed lines.

Each of the feed lines 3*a*, 3*b*, 3*c* is connected with an individual dusting powder hopper 1*a*, 1*b*, 1*c*. Each feed pipe leads into the internal space 11 of the reactor building and there is at least one dust dispersion nozzle, and generally more than one. Thus, the powder hopper 1*b* feeds power into the line 3*b* which is sprayed out by the nozzles 12' and 12" shown in FIG. 2 and others not shown in the drawing. The provision of several independent systems, each with its own supply hopper for the dust or powder particles, for introducing the particles into the internal reactor space is, of course, an advantage from the point of view of security and reliability.

The distribution of the dusting nozzles 12′ 12″ over the ceiling surface 16 in the internal space 11 of the reactor building is illustrated in FIG. 2. The spacing between the dusting nozzles 12′ and 12″ as well as between these and the adjacent dusting nozzles on the adjacent feed lines is determined with regard to magnitude of the dusting radius provided for the dusting powder particles, in such a way that a distribution of the dust particles that is to a great extent homogeneous is produced in the gas atmosphere in the internal space of the reactor building. The amount of dust or powder to be blown into that space is determined by the desired reaction of the content of fission and activation products after dusting of the gas atmosphere by blowing in the dust particles.

FIG. 3 shows that at least 500 kg of dusting particles of an average grain size d′=0.5 μm should be injected for $50.10^3$ $m^3$ of volume of the enclosed gas atmosphere, in order to knock down the content of fission and activation products from 1% to $1\cdot10^{-4}$% within a period of 100 hours. Shorter periods for the reduction of the fission and activation products in the gas atmosphere can be obtained by dispensing larger quantities of dusting powder. If 40 tons of dusting particles of the same average grain size d′=0.5 μm are introduced in a space having a volume of $50\cdot10^3$ $m^3$, the content of fission and activation products falls from 1% of to a value of $1\cdot10^{-4}$% after only approximately one hour.

Although the invention has been described with reference to a particular illustrative example, it will be understood that modifications and variations are possible within the inventive concept.

I claim:

1. A method of separating nuclear fission and activation products from a gaseous atmosphere in which said products are found, said method comprising the step of introducing and dispersing, into said gaseous atmosphere containing said products, at least 1 kg, per 50 $m^3$ of atmosphere volume of fine dry particles of a substance inert with respect to said atmosphere having an average particle size in the range of from 0.3 to 5 μm.

2. A method as defined in claim 1 in which said particles are particles of ceramic material which is inert with respect to oxygen.

3. A method as defined in claim 2 in which said particles are fire extinguisher power.

4. Apparatus for separating nuclear fission and activation products from a gas atmosphere containing said products within the reactor building of a gas-cooled nuclear reactor having outer walls (9) of pre-stressed concrete equipped with a liner (10), comprising:

a supply hopper container containing fine dry particles of a substance inert with respect to said atmosphere and having an average particle size in the range of from 0.3 to 5 μm (1) a pneumatic feed ine (3) and a source of compressed gas (4,5,6,7) for supplying to said atmosphere said fine dry particles pneumatically, said hopper container having a feed outlet (2) opening into said pneumatic feed line (3), said feed line being connected at its external end to said source of compressed gas (4,5,6,7), and also passing through said concrete wall structure, and having at least one dispersion nozzle for said particles connected to said feed line and which is situated in the internal space (11) of said reactor building within said concrete wall structure (9).

5. Apparatus as defined in claim 4 in which said hopper container (1) is located outside said reactor building.

6. Apparatus as defined in claim 4 or claim 5 in which said pneumatic feed line has a plurality of branches (*3a,3b,3c*), each equipped with at least one said dust-dispersion nozzle, said at least one nozzle being located in the internal space (11) of said reactor building and located on the ceiling (15) of said building.

7. A method of separating nuclear fission and activation products from a gaseous atmosphere in which said products are found, said method comprising the step of introducing and dispersing, into said gaseous atmosphere containing said products, at least 0.5 kg, per 50 $m^3$ of atmosphere volume, of fine dry particles having an average particle size in the range of from 0.3 to 5 μm which are inert with respect to said gaseous atmosphere.

* * * * *